United States Patent
Kariya et al.

(10) Patent No.: US 12,325,295 B2
(45) Date of Patent: Jun. 10, 2025

(54) OFF-ROAD VEHICLE

(71) Applicant: KAWASAKI MOTORS, LTD., Hyogo (JP)

(72) Inventors: Kento Kariya, Akashi (JP); Takashi Hisamura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/119,305

(22) Filed: Mar. 9, 2023

(65) Prior Publication Data

US 2024/0300318 A1  Sep. 12, 2024

(51) Int. Cl.
*B60K 11/06* (2006.01)
*B60K 11/08* (2006.01)
*B62D 25/20* (2006.01)

(52) U.S. Cl.
CPC .............. *B60K 11/06* (2013.01); *B60K 11/08* (2013.01); *B62D 25/2072* (2013.01)

(58) Field of Classification Search
CPC ........ B60K 11/06; B60K 11/08; F01M 5/002; F01M 2011/0025; F01P 9/04; F16H 57/0416
See application file for complete search history.

(56) References Cited

U.S. PATENT DOCUMENTS

| | | | | |
|---|---|---|---|---|
| 1,318,706 A | * | 10/1919 | Talbot | F01M 5/002 244/57 |
| 1,653,427 A | * | 12/1927 | Beebee | F01M 5/002 60/912 |
| 2,577,188 A | * | 12/1951 | Hall | F01M 11/0004 184/104.2 |
| 4,848,453 A | * | 7/1989 | Evans | F16H 57/0415 165/44 |
| 5,408,965 A | * | 4/1995 | Fulton | F01M 11/0004 123/196 AB |
| 5,927,384 A | * | 7/1999 | Waldner, Jr. | F16H 57/0415 165/47 |
| 6,544,085 B1 | * | 4/2003 | Menard | B63H 21/10 165/44 |
| 6,616,836 B1 | * | 9/2003 | Covington | B01D 35/0273 210/450 |
| 7,637,337 B2 | * | 12/2009 | Stranges | F01M 11/0004 180/69.1 |
| 8,544,583 B2 | * | 10/2013 | Ajisaka | B62D 35/02 180/68.1 |
| 8,763,739 B2 | | 7/2014 | Belzile et al. | |
| 9,840,144 B2 | * | 12/2017 | Aizawa | B60R 19/023 |
| 10,125,728 B2 | * | 11/2018 | Mackenzie | F02M 35/02491 |
| 10,144,378 B2 | * | 12/2018 | Goldsberry | B60R 19/52 |
| 10,160,308 B2 | * | 12/2018 | Chae | B60T 5/00 |
| 10,189,348 B2 | * | 1/2019 | Wendelmuth | B60K 11/08 |
| 10,344,847 B2 | * | 7/2019 | Palmer | F16H 57/0416 |
| 10,550,927 B2 | * | 2/2020 | Dunham | F01N 13/1822 |
| 10,689,039 B2 | * | 6/2020 | Kurokawa | A01B 69/02 |
| 10,859,150 B2 | * | 12/2020 | Dahl | F16H 57/0416 |
| 10,995,847 B2 | * | 5/2021 | Gralka | F01M 5/002 |
| 11,554,661 B2 | * | 1/2023 | Morimoto | B60K 11/08 |

(Continued)

*Primary Examiner* — Timothy Wilhelm
(74) *Attorney, Agent, or Firm* — XSENSUS LLP

(57) ABSTRACT

An off-road vehicle includes a vehicle body 2 having an underguard 1. The underguard 1 has openings 3 that introduce traveling air into the vehicle body 2 and ribs 4 that reinforce the underguard 1 and guide the traveling air passing through the openings 3.

10 Claims, 7 Drawing Sheets

(56) References Cited

U.S. PATENT DOCUMENTS

| | | | |
|---|---|---|---|
| 11,642,933 B2* | 5/2023 | Moradnia | B60H 1/00328 |
| | | | 165/202 |
| 12,115,850 B2* | 10/2024 | Moradnia | B60R 19/48 |
| 2012/0024611 A1* | 2/2012 | Ajisaka | B60K 11/08 |
| | | | 180/68.1 |

* cited by examiner

OFF-ROAD VEHICLE

FIELD

The technique disclosed herein relates to an off-road vehicle.

BACKGROUND

U.S. Pat. No. 8,763,739 discloses an off-road vehicle. A transmission, an engine, etc. are located inside a vehicle body of the off-road vehicle.

SUMMARY

A component such as a transmission or an engine needs to be effectively cooled.

The technique disclosed herein has been made in view of the above-described point, and an object thereof is to effectively cool a component inside a vehicle body of an off-road vehicle.

The off-road vehicle disclosed herein includes a vehicle body having an underguard. The underguard has openings that introduce traveling air into the vehicle body and ribs that reinforce the underguard and guide the traveling air passing through the openings.

The component inside the off-road vehicle can be effectively cooled.

DESCRIPTION OF EMBODIMENTS

Figure 1:
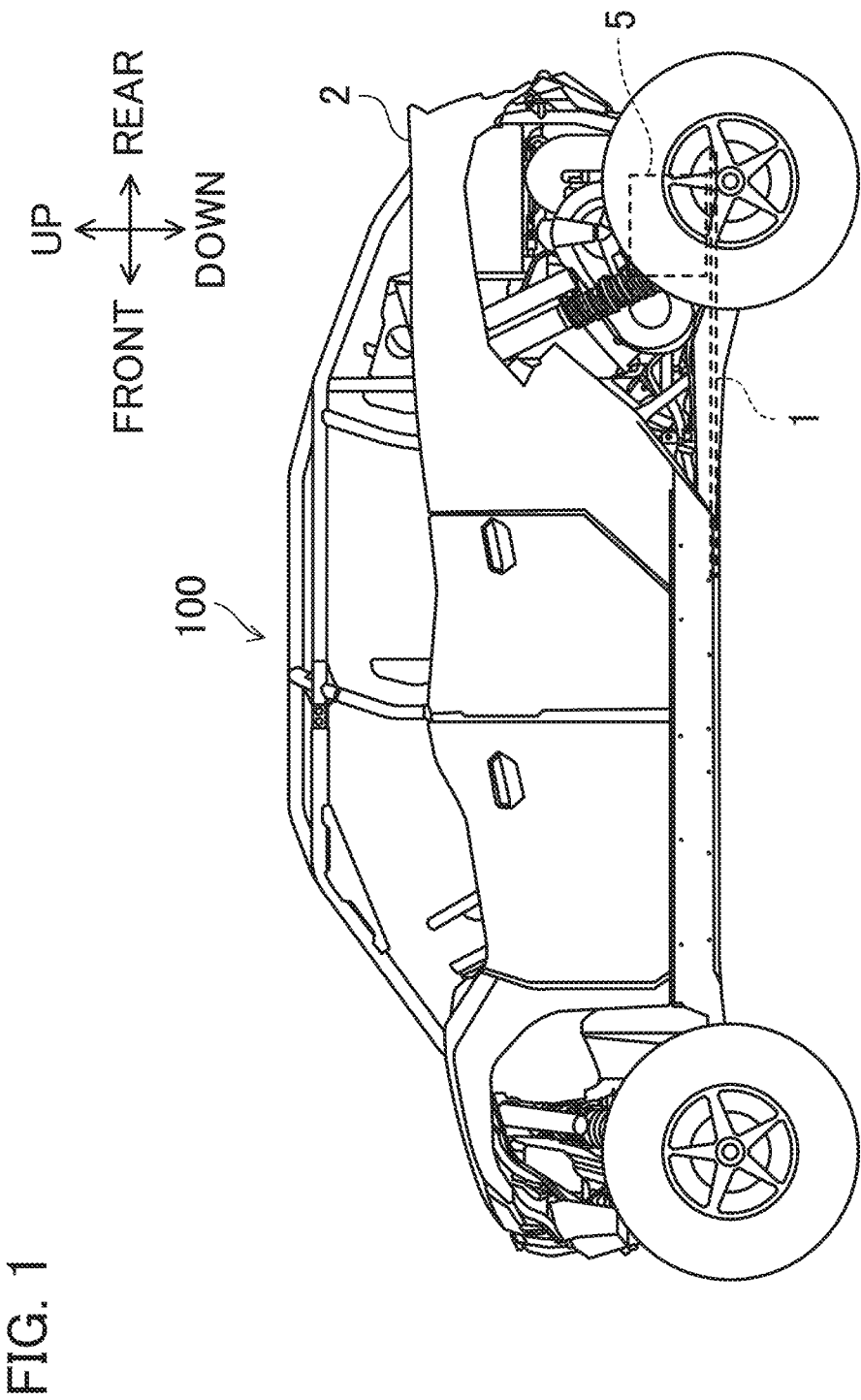
FIG. 1 is a side view of a utility vehicle.

Hereinafter, an exemplary embodiment will be described based on the drawings. FIG. 1 is a side view of a utility vehicle 100. The utility vehicle 100 is a four-wheeled vehicle that can travel off road. The utility vehicle 100 is one example of an off-road vehicle. Hereinafter, the utility vehicle 100 will also be merely referred to as a "vehicle 100."

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction."

The vehicle 100 includes a vehicle body 2 having an underguard 1. The vehicle body 2 is a portion of the vehicle 100, which is a basic framework such as a vehicle body frame, a hood, and a door. A transmission 5 may be located inside the vehicle body 2.

The underguard 1 protects, e.g., a component inside the vehicle body 2. The underguard 1 is made of metal. The underguard 1 is in a plate shape. Specifically, the underguard 1 is in a plate shape flat across the entirety thereof. The underguard 1 is exposed to the outside from the vehicle body 2. The underguard 1 is located at a lower portion of the vehicle body 2 so as to face a road surface.

Figure 2:
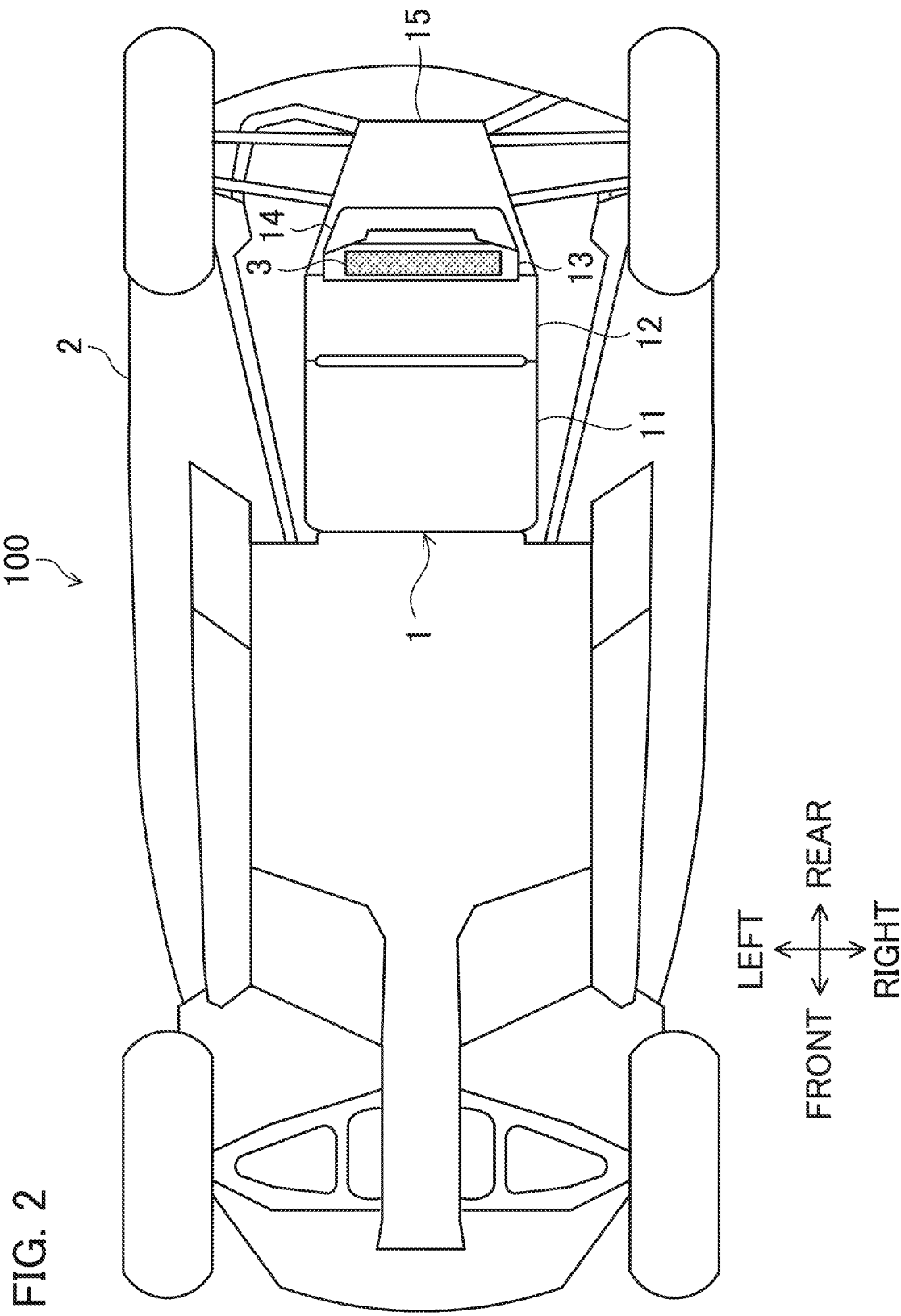
FIG. 2 is a bottom view of the utility vehicle.

FIG. 2 is a bottom view of the vehicle 100. In this example, the underguard 1 is located relatively at the rear at the lower portion of the vehicle body 2. The underguard 1 is divided into plates. For example, the underguard 1 includes a first plate 11, a second plate 12, a third plate 13, a fourth plate 14, and a fifth plate 15. The first plate 11, the second plate 12, the third plate 13, the fourth plate 14, and the fifth plate 15 are located in this order from the front to the rear. The first plate 11, the second plate 12, the third plate 13, the fourth plate 14, and the fifth plate 15 are one example of plates.

Figure 3:
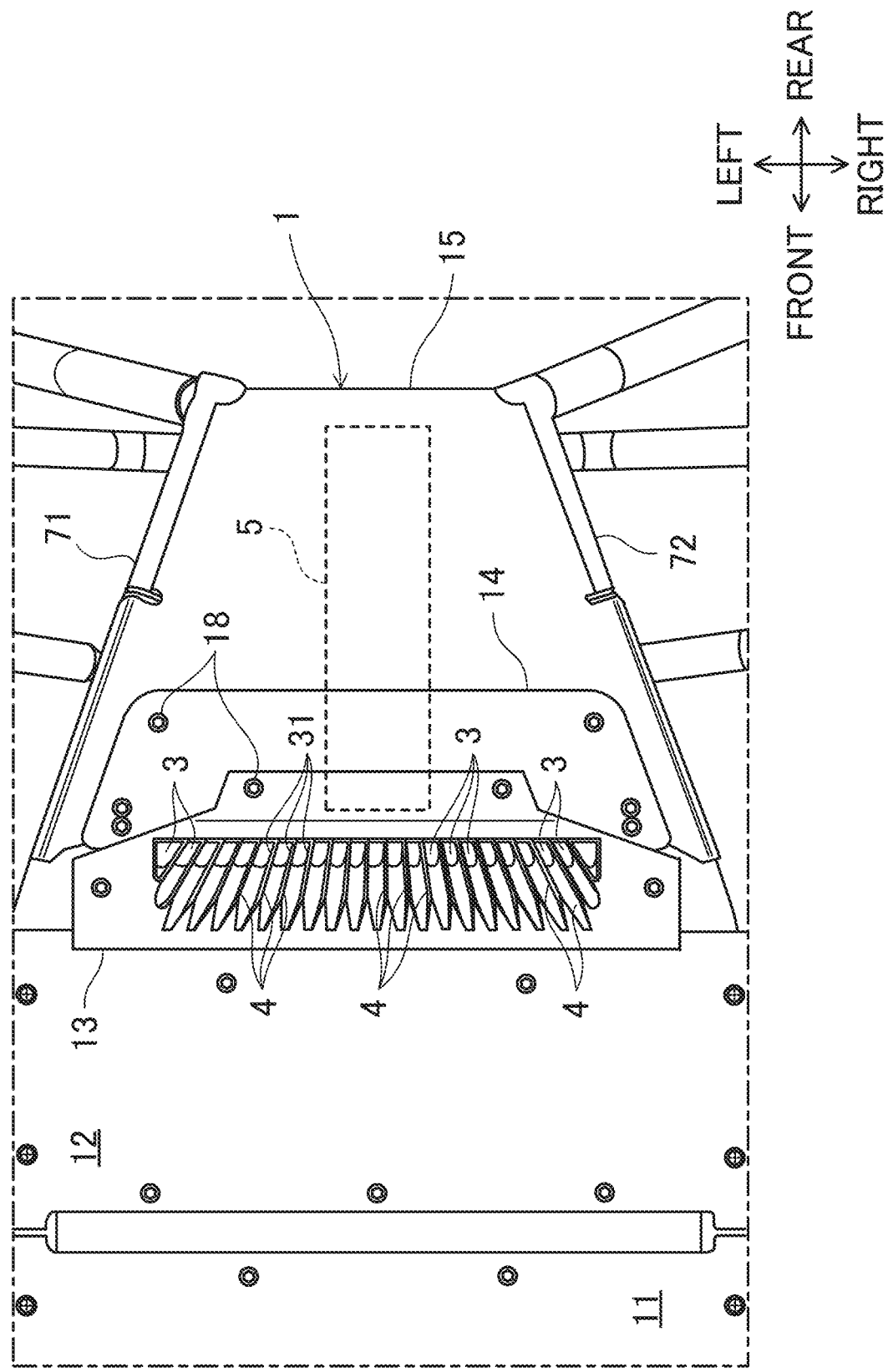
FIG. 3 is a partially-enlarged view of a bottom surface of the utility vehicle.
Figure 4:
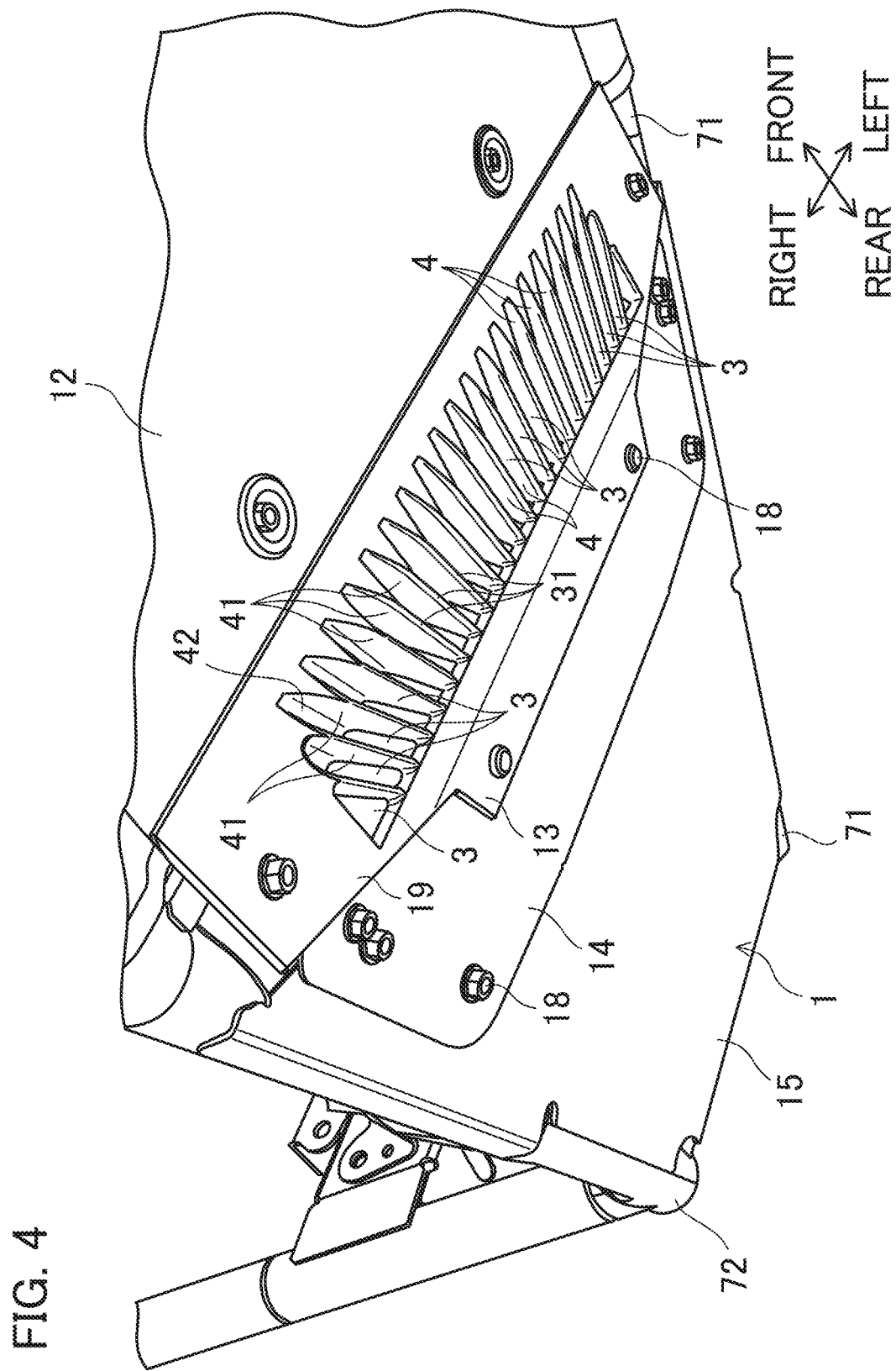
FIG. 4 is a perspective view showing an underguard diagonally from below.

FIG. 3 is a partially-enlarged view of a bottom surface of the utility vehicle 100. FIG. 4 is a perspective view showing the underguard 1 diagonally from below. The first plate 11 and the second plate 12 are located with a slight clearance in the front-rear direction. The second plate 12 and the third plate 13 are located such that portions thereof in the front-rear direction overlap with each other. Similarly, the third plate 13 and the fourth plate 14 are located such that portions thereof in the front-rear direction overlap with each other. Similarly, the fourth plate 14 and the fifth plate 15 are located such that portions thereof in the front-rear direction overlap with each other.

The underguard 1 is attached to a first vehicle body frame 71 and a second vehicle body frame 72 aligned in the vehicle width direction. The first vehicle body frame 71 is located at the left, and the second vehicle body frame 72 is located at the right. Each of the first vehicle body frame 71 and the second vehicle body frame 72 extends substantially in the front-rear direction. More specifically, rear portions of the first vehicle body frame 71 and the second vehicle body frame 72 extend in a direction inclined with respect to the front-rear direction. One of side edges of the underguard 1 in the vehicle width direction is attached to the first vehicle body frame 71, and the other side edge of the underguard 1 in the vehicle width direction is attached to the second vehicle body frame 72. More specifically, a left side edge of each of the first plate 11, the second plate 12, and the fifth plate 15 is attached to the first vehicle body frame 71, and a right side edge of each of the first plate 11, the second plate 12, and the fifth plate 15 is attached to the second vehicle body frame 72. The fourth plate 14 is attached to the fifth plate 15 with bolts 18. The third plate 13 is attached to the fourth plate 14 with bolts 18. In this manner, the third plate 13 and the fourth plate 14 are attached to the first vehicle body frame 71 and the second vehicle body frame 72 through the fifth plate 15. The third plate 13 is detachable from the fourth plate 14 by detachment of the bolts 18.

The underguard 1 has openings 3 and ribs 4. The openings 3 introduce traveling air into the vehicle body 2. Specifically, the openings 3 introduce the traveling air into a space, where a cooling target component is located, inside the vehicle body 2. The ribs 4 reinforce the underguard 1, and guide the traveling air passing through the openings 3. Specifically, the ribs 4 guide the traveling air to the cooling target component located inside the vehicle body 2. In this example, the cooling target component is the transmission 5.

The openings 3 and the ribs 4 are located at the third plate 13. That is, the third plate 13 at which the openings 3 are located is detachable from other plates, i.e., the fourth plate 14 etc.

Figure 5:
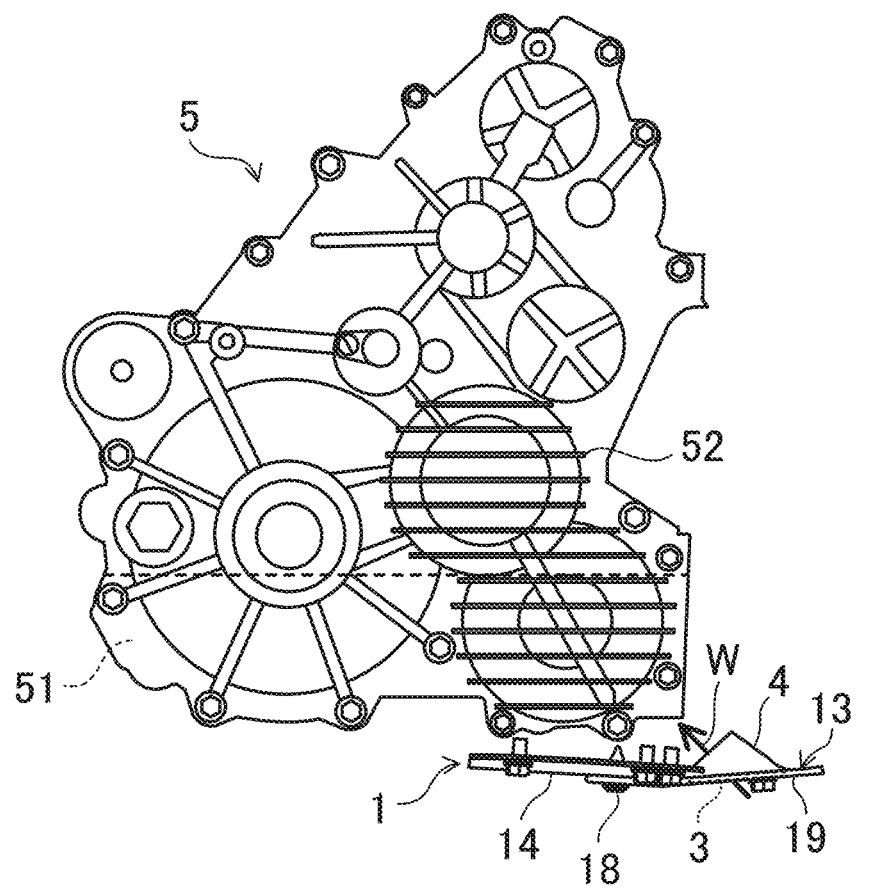
FIG. 5 is a view for describing location of the underguard and a transmission as viewed from the side.

FIG. 5 is a view for describing location of the underguard 1 and the transmission 5 as viewed from the side. FIG. 5 shows only the third plate 13 and the fourth plate 14 of the underguard 1. The positions of the openings 3 in the front-rear direction are at the front with respect to the position of the transmission 5 in the front-rear direction. The position in the front-rear direction as described herein means only a position in the front-rear direction regardless of positions in directions other than the front-rear direction, i.e., a position in an up-down direction and a position in the vehicle width direction. Note that the transmission 5 is not located across the entirety of the vehicle body 2 in the vehicle width direction in the vehicle body 2, but is located substantially at the center in the vehicle width direction in the vehicle body 2 as indicated by a dashed line in FIG. 3.

The transmission 5 has an oil sump 51 where oil is stored. In FIG. 5, a lower portion (a portion lower than a dashed line in FIG. 5) in an internal space of the transmission 5 is the oil sump 51. The transmission 5 may further include outwardly-protruding fins 52. The fins 52 are located at a portion of a casing of the transmission 5 corresponding to the oil sump 51. The fins 52 promote heat dissipation of the transmission 5. The ribs 4 guide the traveling air W to the oil sump 51 of the transmission 5. The traveling air W passing through the openings 3 is guided to the transmission 5 by the ribs 4, and passes around the fins 52.

The underguard 1 includes an inclined portion 19 inclined such that a front portion is positioned higher than a rear portion. Specifically, the third plate 13 includes the inclined portion 19. More specifically, the openings 3 and the ribs 4 are located at the inclined portion 19.

Figure 6:
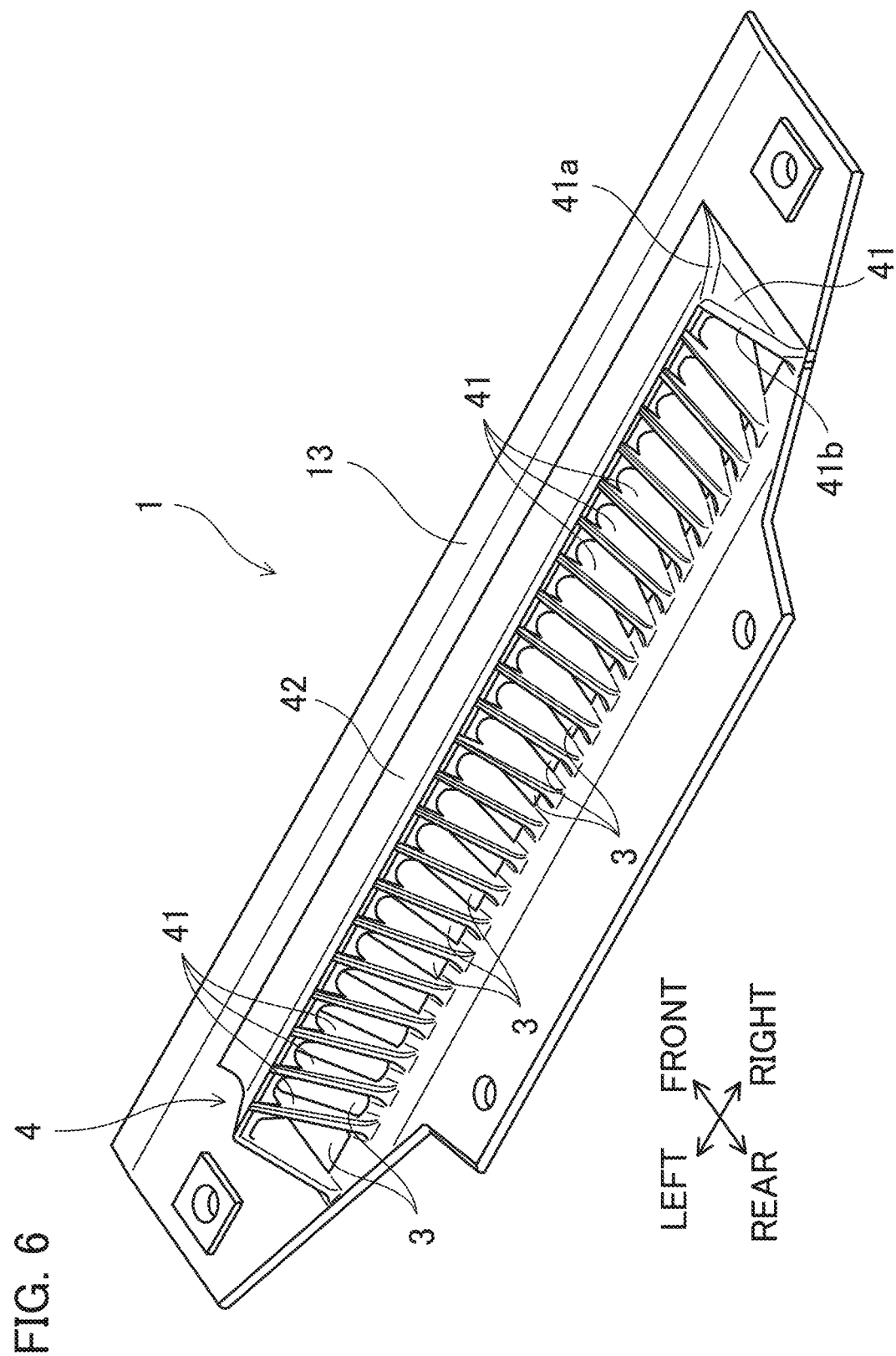
FIG. 6 is a perspective view showing a third plate of the underguard diagonally from above.

Subsequently, the openings 3 and the ribs 4 will be described in more detail. FIG. 6 is a perspective view showing the third plate 13 of the underguard 1 diagonally from above.

The openings 3 penetrate the underguard 1 in a thickness direction thereof. The openings 3 are aligned in a predetermined direction. The predetermined direction may be one direction or two or more directions. In this example, the openings 3 are aligned in one direction, specifically substantially in the vehicle width direction, as shown in FIGS. 3 and 4.

Specifically, the openings 3 are located in a grid pattern as shown in FIGS. 3, 4, and 6. The grid pattern means that the openings 3 are aligned adjacent to each other in the predetermined direction. In this example, three or more openings 3, preferably four or more openings 3, and more preferably five or more openings 3 are adjacent to each other in the predetermined direction. Much more preferably, 10 or more openings 3 are adjacent to each other in the predetermined direction. The openings 3 aligned in the predetermined direction are separated from each other by partitions 31 included in the underguard 1. The partitions 31 linearly extend to the rear.

In this example, each opening 3 has an elongated shape extending in a predetermined longitudinal direction. The longitudinal directions of the openings 3 are not parallel with each other. The longitudinal directions of the openings 3 radially extend as converging to a position at the rear. That is, the partitions 31 separating the openings 3 from each other radially extend as converging to a position at the rear.

In this example, the longitudinal directions of the openings 3 or the partitions 31 radially extend as converging to the transmission 5 at the rear.

In this example, the ribs 4 are located downstream of the openings 3 in a traveling air flow direction. Specifically, the ribs 4 are located on an inner surface of the underguard 1. That is, the ribs 4 guide the traveling air having passed through the openings 3. The ribs 4 include a rib 4 inclined with respect to both the front-rear direction and the vehicle width direction. Specifically, the ribs 4 extend as converging to a position at the rear when viewed from a direction facing the underguard 1. That is, the ribs 4 converge as extending to the rear. In other words, the ribs 4 radially spread as extending to the front. That is, one of the ribs 4 positioned substantially at the center in the vehicle width direction extends substantially in the front-rear direction. Ones of the ribs 4 positioned relatively outside in the vehicle width direction are inclined with respect to both the front-rear direction and the vehicle width direction so as to be positioned inside in the vehicle width direction as extending to the rear. The more outside in the vehicle width direction the rib 4 is positioned, the greater inclination angle with respect to the front-rear direction the rib 4 has.

Specifically, the ribs 4 include first ribs 41 and a second rib 42 as shown in FIG. 6. The first ribs 41 extend upwardly from the underguard 1 into the vehicle body 2. The positions of the first ribs 41 in the front-rear direction are substantially the same as the positions of the openings 3 in the front-rear direction. The first ribs 41 are aligned substantially in the vehicle width direction.

The ribs 4 are located corresponding to the openings 3. One first rib 41 is located on each side of the opening 3 in the vehicle width direction. That is, as shown in FIG. 4, the first ribs 41 are located one by one at the partitions 31. The first ribs 41 extend as converging to a position at the rear, as shown in FIG. 3.

In this example, the first rib 41 has substantially a triangular shape pointed to above as viewed from the side. As shown in FIG. 6, the first rib 41 has a first upper edge 41a extending diagonally upwardly to the rear and a second upper edge 41b extending diagonally downwardly to the rear from a rear end of the first upper edge 41a.

The second rib 42 couples the first ribs 41 to each other, and extends diagonally upwardly to the rear. Specifically, the second rib 42 extends diagonally upwardly to the rear as extending from the underguard 1 into the vehicle body 2. The second rib 42 has substantially a rectangular shape extending substantially in the vehicle width direction. The second rib 42 is joined to the first upper edges 41a of the first ribs 41. In this manner, the second rib 42 couples the first ribs 41 to each other. A front edge, i.e., a lower edge, of the second rib 42 is joined to front opening edges of the openings 3.

The second rib 42 and adjacent two of the first ribs 41 function as a ventilation pipe that covers a downstream portion of the opening 3 from above and both sides in the vehicle width direction and opens diagonally upwardly to the rear. That is, the traveling air passing through the openings 3 is guided diagonally upwardly to the rear by the second rib 42, and is guided in the front-rear direction or the direction inclined with respect to both the front-rear direction and the vehicle width direction by the first ribs 41.

Since the underguard 1 has the openings 3, the underguard 1 tends to have a lower strength as compared to a flat plate with no openings. However, the ribs 4 are located around the openings 3 of the underguard 1, and therefore, the underguard 1 can be reinforced. In addition, the ribs 4 include the first ribs 41 coupled to each other and the second rib 42, and therefore, have a three-dimensional shape. Since the ribs 4 have the three-dimensional shape, the underguard 1 is further reinforced.

In the vehicle 100 configured as described above, the underguard 1 has the openings 3. The openings 3 introduce the traveling air into the vehicle body 2. With this traveling air, the cooling target component such as the transmission 5 is cooled. Further, the underguard 1 has the ribs 4. The ribs 4 reinforce the underguard 1, and guide the traveling air passing through the openings 3. With these ribs 4, the strength of the underguard 1 can be ensured even in a case where the underguard 1 has the openings 3.

The openings 3 are located in the grid pattern so that the opening 3 can be reduced in size as compared to the case of a single opening not divided into a grid pattern. This can reduce entrance of a foreign object such as a dead leaf into the vehicle body 2.

The positions of the openings 3 in the front-rear direction are at the front with respect to the position of the transmission 5 in the front-rear direction. Since the traveling air flows to the rear, the traveling air introduced through the openings 3 can be easily directed to the transmission 5.

The ribs 4 guide the traveling air to the oil sump 51 of the transmission 5. Thus, oil in the transmission 5 can be efficiently cooled. Since the oil circulates in the transmission 5, the entirety of the transmission 5 can be cooled as a result of cooling of the oil sump 51. Further, the fins 52 are located at the portion of the casing of the transmission 5 corresponding to the oil sump 51. The ribs 4 direct the traveling air to the fins 52 so that the transmission 5 can be more effectively cooled.

The ribs 4 include the ribs 4 inclined with respect to both the front-rear direction and the vehicle width direction. The traveling air tends to flow substantially in the front-rear direction. With the inclined ribs 4, the traveling air flow direction can be changed. Thus, the traveling air can be easily directed to the cooling target component.

More preferably, the ribs 4 extend as converging to a position at the rear. In some cases, the cooling target component is not located across the entirety of the vehicle body 2 in the vehicle width direction in the vehicle body 2, but is located at part of the vehicle body 2 in the vehicle width direction. Even in these cases, the traveling air can be converged and concentrated to the cooling target component. As a result, the cooling target component can be more effectively cooled.

At least some of the openings 3 are located at the inclined portion 19 of the underguard 1. The inclined portion 19 is inclined such that the front portion is positioned higher than the rear portion. With this configuration, the traveling air can be easily introduced into the openings 3. As a result, the volume of traveling air passing through the openings 3 can be increased, and accordingly, the cooling target component can be more effectively cooled.

The third plate 13 at which the openings 3 are located is detachable from other plates. For example, in a case where some of the openings 3 are clogged, only the third plate 13 is detached from the vehicle body 2 so that the third plate 13 can be maintained or replaced. That is, the maintainability of the underguard 1 is improved.

The ribs 4 include the first ribs 41 and the second rib 42. The first ribs 41 are aligned substantially in the vehicle width direction. The second rib 42 couples the first ribs 41 to each other, and extends diagonally upwardly to the rear. With this configuration, the ribs 4 can function as the ventilation pipes to properly guide the traveling air. Specifically, the first ribs 41 adjust inclination of the traveling air flow direction to the vehicle width direction with respect to the front-rear direction. Further, since the second rib 42 extends diagonally upwardly to the rear, the second rib 42 guides the traveling air diagonally upwardly to the rear. As a result, the traveling air introduced through the openings 3 is easily concentrated to the cooling target component.

<<Other Embodiments>>

The embodiment has been described above as an example of the technique disclosed in the present application. However, the technique in the present disclosure is not limited to above, and is also applicable to embodiments to which changes, replacements, additions, omissions, etc, are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The shape, location, etc. of the underguard 1 are not limited. The underguard 1 may be divided into four or more plates or six or more plates. The underguard 1 may be a single plate. The underguard 1 may be at any location at the front, center, or rear of the vehicle as long as the traveling air can contact the cooling target component.

The shape and location of the openings 3 is not limited as long as the traveling air can be introduced into the vehicle body 2. Each opening 3 may be in a polygonal shape, a shape surrounded by a curved line, or a combination thereof. The openings 3 may be aligned in a predetermined first direction (e.g., the vehicle width direction), and may be aligned in a second direction (e.g., the front-rear direction) crossing the predetermined first direction. The openings 3 may be located geometrically two-dimensionally.

The positions of the openings 3 in the front-rear direction are not necessarily at the front with respect to that of the transmission 5. For example, the positions of the openings 3 in the front-rear direction may be the same as the position of the transmission 5 in the front-rear direction. That is, the openings 3 may be located below the transmission 5.

All the openings 3 are not necessarily located at the inclined portion 19. For example, the opening 3 may be located from the inclined portion 19 to a horizontal portion of the underguard 1. Alternatively, some of the openings 3 may be located at the inclined portion 19, and the other openings 3 may be located at the horizontal portion of the underguard 1. All the openings 3 may be located at the horizontal portion of the underguard 1.

The shape, location, etc. of the ribs 4 are not limited as long as the underguard 1 can be reinforced and the traveling air passing through the openings 3 can be guided. For example, the ribs 4 may extend merely in the front-rear direction. All the ribs 4 may be inclined to one side in the vehicle width direction with respect to the front-rear direction. With this configuration, the traveling air can be guided to the cooling target component even in a case where the cooling target component is located unevenly on one side in the vehicle width direction. The ribs 4 may radially extend to the rear. With this configuration, the traveling air can be guided to an area broader than the width of all the openings 3 in the vehicle width direction.

The ribs 4 may include only the first ribs 41 or only the second rib 42. The ribs 4 may include a rib other than the first ribs 41 and the second rib 42. The shape of the first rib 41 is not limited to the substantially triangular shape, and may be an optional shape. The shape of the second rib 42 is not limited to the substantially rectangular shape, and may be an optional shape. The second rib 42 is not necessarily joined to the first ribs 41. The second rib 42 may be joined not to all the first ribs 41, but to only some of the first ribs 41. The ribs 4 may include the second ribs 42 coupling some of the first ribs 41 to each other.

In the above-described example, one rib 4 is located on each side of the opening 3 in the vehicle width direction. However, location of the ribs 4 does not necessarily correspond to the openings 3. The positions of the ribs 4 in the front-rear direction may be different from the positions of the openings 3 in the front-rear direction. For example, the ribs 4 may be offset to the rear with respect to the openings 3. The ribs 4 may be located around some of the openings 3, and are not necessarily located around the remaining openings 3. For example, the openings 3 may be located so as to spread two-dimensionally, and the ribs 4 may be located so as to spread only in the vehicle width direction.

The ribs 4 may be at optional positions as long as the traveling air passing through the openings 3 can be guided. The positions of the ribs 4 are not limited to those downstream of the openings 3 in the traveling air flow direction. The ribs 4 may be located on an outer surface of the underguard 1 to guide the traveling air before the traveling air passes through the openings 3. Even in a case where the ribs 4 are located upstream of the openings 3, the ribs 4 define a direction of the traveling air flowing into the openings 3, and as a result, the ribs 4 guide the traveling air passing through the openings 3. Alternatively, the ribs 4 may be located on the outer and inner surfaces of the underguard 1, i.e., both upstream and downstream of the openings 3.

Figure 7:
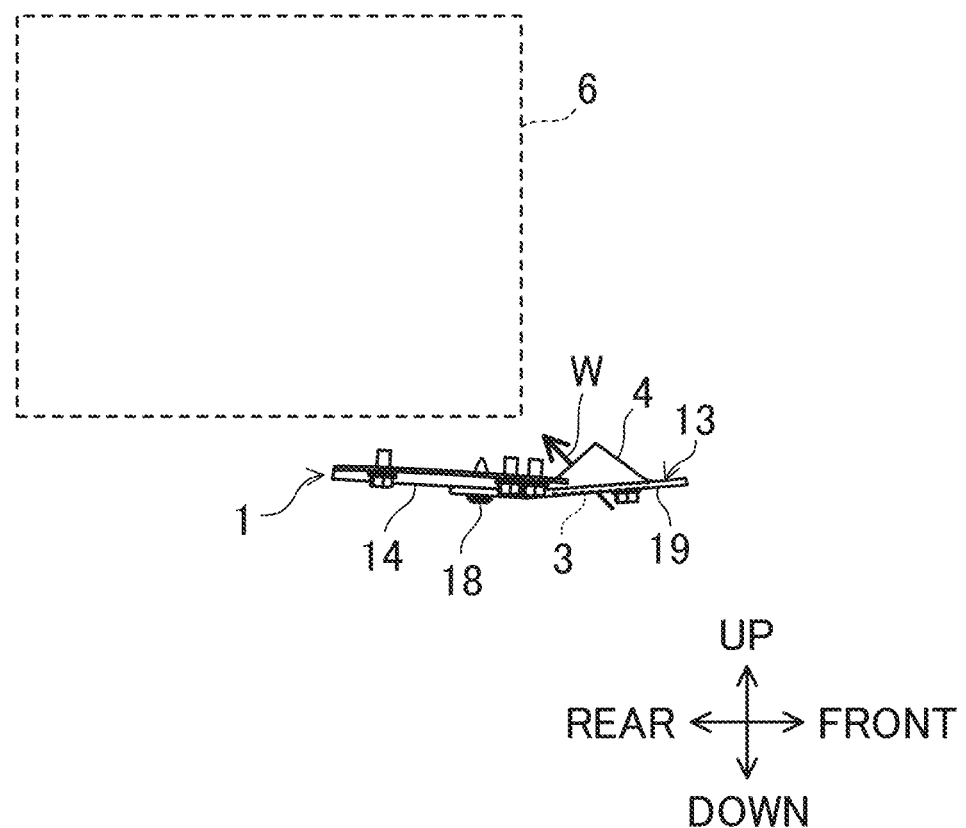
FIG. 7 is a view for describing location of the underguard and an engine as viewed from the side.

The ribs 4 may guide the traveling air to the cooling target component other than the transmission 5. That is, the cooling target component is not limited to the transmission 5. For example, the cooling target component may be a drive source, specifically an engine. FIG. 7 is a view for describing location of the underguard 1 and the engine 6 as viewed from the side. In FIG. 7, the engine 6 is indicated by a dashed line for the sake of convenience in description. The vehicle 100 may further include the engine 6 inside the vehicle body. The engine 6 is one example of a drive source. In this case, the positions of the openings 3 in the front-rear direction may be at the front with respect to the position of the engine 6 in the front-rear direction. With this configuration, the traveling air W having passed through the openings 3 can be easily guided to the engine 6. In a case where the ribs 4 guide the traveling air to the transmission 5, the traveling air may be guided to a portion other than the oil sump 51.

The technique of the present disclosure as described above will be summarized as follows.

[1] The utility vehicle 100 (the off-road vehicle) includes the vehicle body 2 having the underguard 1. The underguard 1 has the openings 3 that introduce the traveling air into the vehicle body 2 and the ribs 4 that reinforce the underguard 1 and guide the traveling air passing through the openings 3.

According to this configuration, the underguard 1 has the openings 3 that introduce the traveling air into the vehicle body 2, and therefore, the cooling target component can be cooled with this traveling air. Further, the underguard 1 having the openings 3 can be reinforced by the ribs 4. In addition, the number of components can be reduced and the cooling target component can be effectively cooled, using the ribs 4 for guiding the traveling air.

[2] In the utility vehicle 100 of [1], the openings 3 are located in the grid pattern.

According to this configuration, as compared to the case of a single large opening, the traveling air can be introduced through the openings 3 located in the grid pattern while entrance of a foreign object such as a dead leaf into the vehicle body 2 is prevented.

[3] In the utility vehicle 100 of [1] or [2], the ribs 4 include the ribs 4 inclined with respect to both the front-rear direction and the vehicle width direction.

According to this configuration, the traveling air can be circulated not only in the front-rear direction but also in the direction inclined to the vehicle width direction with respect to the front-rear direction. With this configuration, the inclined ribs 4 can adjust the traveling air flow direction, and the cooling target component can be effectively cooled.

[4] In the utility vehicle 100 of any one of [1] to [3], the ribs 4 converge extend as converging to a position at the rear.

According to this configuration, the traveling air passing through the openings 3 can be converged and concentrated to the cooling target component. As a result, the cooling target component can be effectively cooled.

[5] The utility vehicle 100 of any one of [1] to [4] further includes at least one of the transmission 5 or the engine 6 (the drive source) located inside the vehicle body 2. The positions of the openings 3 in the front-rear direction are at the front with respect to the position of the at least one of the transmission 5 or the engine 6 in the front-rear direction.

According to this configuration, the at least one of the transmission 5 or the engine 6 can be cooled with the traveling air having passed through the openings 3.

[6] In the utility vehicle 100 of any one of [1] to [5], the underguard 1 includes the inclined portion 19 inclined such that the front portion is positioned higher than the rear portion, and at least some of the openings 3 are located at the inclined portion 19.

According to this configuration, the traveling air easily enters the openings 3. As a result, the volume of traveling air introduced through the openings 3 can be increased, and the cooling target component can be more effectively cooled.

[7] In the utility vehicle 100 of any one of [1] to [6], the ribs 4 include the first ribs 41 aligned substantially in the vehicle width direction and the second rib 42 coupling the first ribs 41 to each other and extending diagonally upwardly to the rear.

According to this configuration, the ribs 4 can function as the ventilation pipes, and therefore, most of the traveling air having passed through the openings 3 can contact the cooling target component. As a result, the cooling target component can be more effectively cooled.

[8] The utility vehicle 100 of any one of [1] to [7] further includes the transmission 5 located inside the vehicle body 2. The transmission 5 has the oil sump 51, and the ribs 4 guide the traveling air to the oil sump 51.

According to this configuration, the cooled oil circulates in the transmission 5, and accordingly, the entirety of the transmission 5 can be efficiently cooled.

[9] In the utility vehicle 100 of any one of [1] to [8], the underguard 1 has the plates, the plates include the third plate 13 at which the openings 3 are located, and the third plate 13 is detachable from other plates, i.e., the fourth plate 14.

According to this configuration, the maintainability of the underguard 1 can be improved.

What is claimed:

1. An off-road vehicle, comprising:
a vehicle body including an underguard,
wherein the underguard includes:
a plate,
openings that penetrate the plate and introduce traveling air into the vehicle body, and
ribs that are located at the plate and reinforce the plate and guide the traveling air passing through the openings,
wherein:
the underguard is exposed to an outside of the vehicle body and is located at a lower portion of the vehicle body so as to be exposed at an underside of the vehicle and face a road surface,
the ribs and the plate are a part of a single component,
the underguard includes another plate to which said plate is secured,
said another plate faces downwardly from an underside of the vehicle and is to protect an underside of the vehicle from objects below the vehicle, and
the plate at which the openings are located is detachable from said another plate.

2. An off-road vehicle comprising:
a vehicle body including an underguard,
wherein the underguard includes:
a plate,
openings that penetrate the plate and introduce traveling air into the vehicle body, and
ribs that are located at the plate and reinforce the plate and guide the traveling air passing through the openings,
wherein:
the underguard is exposed to an outside of the vehicle body and is located at a lower portion of the vehicle body so as to be exposed at an underside of the vehicle and face a road surface,
the ribs and the plate are a part of a single component,
the ribs include a rib inclined with respect to both a front-rear direction and a vehicle width direction, and
the ribs extend as converging to a position at the rear.

3. The off-road vehicle of claim 2, wherein:
the openings are located in a grid pattern.

4. The off-road vehicle of claim 2, further comprising:
at least one of a transmission or a drive source located inside the vehicle body,
wherein positions of the openings in the front-rear direction are at a front with respect to a position of the at least one of the transmission or the drive source in the front-rear direction.

5. The off-road vehicle of claim 2, wherein:
the plate includes an inclined portion inclined such that a front portion is positioned higher than a rear portion, and
at least some of the openings are located at the inclined portion.

6. The off-road vehicle of claim 2, wherein:
the ribs include first ribs aligned substantially in the vehicle width direction and a second rib coupling the first ribs to each other and extending diagonally upwardly to the rear.

7. The off-road vehicle of claim 2, further comprising:
a transmission located inside the vehicle body,
wherein the transmission includes an oil sump, and
the ribs guide the traveling air to the oil sump.

8. The off-road vehicle of claim 2, wherein:
the ribs are at a lowest part of the underguard.

9. The off-road vehicle of claim 2, wherein:
the ribs extend as concentrating the traveling air to a cooling target component located in the position at the rear.

10. The off-road vehicle of claim 2, wherein:
the underguard includes another plate to which said plate is secured,
said another plate faces downwardly from an underside of the vehicle and is to protect an underside of the vehicle from objects below the vehicle, and
the plate at which the openings are located is detachable from said another plate.

* * * * *